Sept. 19, 1967 G. EMDE 3,342,185
CARD SELECTING APPARATUS
Filed Aug. 3, 1965 6 Sheets-Sheet 1

INVENTOR
GÜNTER EMDE

By M<sup></sup>Glew and Toren
ATTORNEYS

Sept. 19, 1967 G. EMDE 3,342,185

CARD SELECTING APPARATUS

Filed Aug. 3, 1965 6 Sheets-Sheet 2

INVENTOR
Günther Emde

By McGlew and Toren
ATTORNEYS

Sept. 19, 1967 G. EMDE 3,342,185

CARD SELECTING APPARATUS

Filed Aug. 3, 1965 6 Sheets-Sheet 3

INVENTOR
GÜNTER EMDE

By McGlew and Toren
ATTORNEYS

Sept. 19, 1967 G. EMDE 3,342,185

CARD SELECTING APPARATUS

Filed Aug. 3, 1965 6 Sheets-Sheet 4

INVENTOR
GÜNTER EMDE

By McGlew and Toren
ATTORNEYS

INVENTOR
GÜNTER EMDE

By McGlew and Toren
ATTORNEYS

INVENTOR
GÜNTER EMDE

By McGlew and Toren
ATTORNEYS

United States Patent Office 3,342,185

Patented Sept. 19, 1967

3,342,185

CARD SELECTING APPARATUS

Günter Emde, Neubiberg, Germany, assignor to Bolkow Gesellschaft mit beschrankter Haftung, Ottobrunn, near Munich, Germany Filed Aug. 3, 1965, Ser. No. 476,922

Claims priority, application Germany, Aug. 17, 1964, B 78,126

11 Claims. (Cl. 129—16.1)

ABSTRACT OF THE DISCLOSURE

The disclosure relates to a method of and apparatus for selecting respective record carriers from stacked record carriers, and to a novel record carrier. In accordance with the disclosure, the record bearers, such as substantially rectangular cards, are provided along one lateral edge with scannable code indicia cooperable with feelers of a searching device reciprocable along the stack of record bearers. During a selection operation, the record bearers are shiftable laterally, by classes, from a neutral position to a selecting position and in accordance with class indicia along opposite lateral edges of the record bearers, with the record bearer to be selected from a class being separated from the other record bearers of its class in the selecting position. The record bearers are divided into only two classes, with each class having respective class indicia common to such opposite edges of all the record bearers included in the respective class. The record bearers are arranged in the stack in such manner that, in both the neutral position and the selecting position, the record bearers of one class alternate with record bearers of the other class.

Selection is effected by reciprocating a searching device along the stack. The selecting operation is a two-step operation, with one step occurring when the searching device is moved in one direction along the stack and the other step occurring when the searching device is returned in the opposite direction along the stack. In the first step, all the record bearers of one class are shifted to the selected position while all the record bearers of the other class are retained in the neutral position. From the record bearers then in the selecting position, a record bearer of the one class having a respective code indicia is separated while the non-selected record bearers of the one class are returned to the neutral position. During the return movement of the searching device, the record bearers of the second class are shifted to the selecting position with one record bearer of the second class being separated from the other record bearers thereof and the non-selected record bearers of the second class being returned to the neutral position. The record bearer of the second class which is separated in the separated position has the same code indicia as the separated record bearer of the one or first class.

A feature of the invention is that the class indicia of the cards are also formed as elements cooperable with retaining means, one retaining means being provided for each class of cards and being "released" while its associated class of cards is moved to the selecting position, the other retaining member remaining interlocked with the cards of its class. A further feature of the disclosure is the provision of means whereby a separated card may be readily returned to the stack without disturbing the other cards in the stack.

This invention relates to the automatic selection of stacked record bearers of the type having scannable identification indicia at their edges cooperable with feelers of a searching device and arranged in a stack of the searching device. More particularly, the present invention relates to a novel method of stacking and selecting such record bearers, to novel record bearers divided into first and second classes with each class provided with a respective classification indicia common to the edges of all the record bearers in the class and cooperable with respective arresting means, and to novel apparatus for automatically selecting the record bearers in accordance with their classification indicia and their identification indicia.

It is known to provide stacked record bearers having scannable identifications at their edges. Such record bearers are usually in the form of flat elements having a pair of parallel side edges, one edge of which is provided with the scannable identification indicia. In the automatic selection, a scanning device is moved along the record bearers, and particularly along that side thereof having the scannable identification indicia thereon. This scanning device is moved until it is oriented with respect to a record bearer having scannable identification indicia corresponding to the setting of selecting means in the apparatus. At such time, an ejector is effective to eject the selected card from the stack.

Equipment of this type requires stable and comparatively thick record bearers which, additionally, must be stacked exactly parallel in order for the ejector to be effective to eject only the selected record bearer. Thus, only a limited number of record bearers can be accommodated in one stack. To accommodate a large number of record bearers, it is possible to arrange several rows or stacks of record bearers next to each other in accordance with the dictates of practical operation. However, this in turn leads to equipment requiring a great deal of space.

In addition, the individual record bearers are complicated and thus correspondingly expensive. Most importantly, partially ejected record bearers cause interruptions in the operation so that operational reliability of such equipment is low.

In another known arrangement, record bearers are suspended, in stacked relation, from magnetic rails, and individual record bearers are picked out or selected by demagnetizing certain magnetic rails. Thereby, the selected record bearer drops from the stack. Adhesion of record bearers to adjacent record bearers is prevented by a blower circulating air between record bearers.

Although a very short access time can be obtained with equipment of this type, that is, a very rapid selection of a desired record bearer from a stack, the expensive equipment is justifiable only if, within a large scale calculating or bookkeeping system, additional storage devices are necessary.

An object of the present invention is to simplify and improve known methods and apparatus for the automatic selection of record bearers having scannable identification indicia at their edges.

Another object of the invention is to simplify and improve known methods and apparatus for automatic selection of such record bearers and in such a manner that the record bearers become universally usable as so-called automatic card files.

A further object of the invention is to divide the record bearers of one stack into two classes each characterized by respective classification indicia cooperable with respective arresting means.

Still another object of the invention is to so divide the record bearers into two classes in such a manner that, in one searching operation, the record bearers of one class are held by the associated arresting means and those of the other class are shifted by feelers.

Yet another object of the invention is to divide the record bearers in one stack into two classes and to stack the record bearers in the stack in a manner such that the to-be-selected record bearers of one class are separated from the not-to-be-selected record bearers of the same class by record bearers of the other class.

A further object of the invention is to provide a selection procedure in which the record bearers of one class are arrested in a rest position during a first operation while the record bearers of the other class are shifted from a rest position by first feelers and the desired record bearer of this other class is selected second by means of selected feelers; and, in a second operation, the record bearers of the class first shifted are arrested in the rest position and the record bearers of the class first arrested are shifted by the first feelers from their rest position and, in the shifted positions, the desired record bearer of the now shifted class are selected by the second feelers.

A still further object of the invention is to provide a selection procedure in which, after such two operations, only the selected record bearers of the two classes can be removed from the stack either manually or by suitable automatic ejection means.

Still another object of the invention is to provide a procedure by means of which the selected record bearers can be returned to any position in the stack and in their original coordination.

In accordance with the invention, if care is taken that the arrangement of the record bearers in the stack is reestablished prior to each selecting operation, the record bearers need not be selected by pairs or groups, and single record bearers can be selected in a single operation. The reestablishment of the required arrangement, which is an automatic consequence of the removal and return of pairs or groups of record bearers to the stack, can be effected when the removed record bearer is returned to its original position in the stack.

Alternatively, if it is to be used for an extended period of time, a substitute record bearer of the same class, kept in reserve for this purpose replaces the selected record bearer in the position of the latter in the stack. This substitute record bearer can later be selected when the originally selected record bearer is no longer needed, in a cycle of the method, and be replaced by the original record bearer in the stack. Preferably, the substitute record carrier is provided with a special identification so that, for any one stack, only two record bearers, one of each class, need be kept in reserve.

A further object of the invention is to provide a method of automatically selecting record bearers having scannable identification indicia at their edges in which all the record bearers which are not to be moved are arrested in a rest position during one selecting cycle, while the record bearers to be moved are separated singly or in groups from those record bearers that are not to be moved. By virtue of this feature of the invention, the displacement of adjacent, but not to be selected record bearers, by the shifting of the record bearers to be selected, is reliably prevented.

Another object of the invention is to provide a record bearer having along one side edge scannable identification indicia cooperable with feelers of a searching device, and having, preferably along an opposite side edge, respective classification indicia corresponding to its respective class and cooperable with a respective arresting means for the class.

Still another object of the invention is to provide record bearers of the type just mentioned, in which, during the selecting procedure, the record bearers can be shifted laterally in opposing directions.

Still a further object of the invention is to provide record bearers, of the type just mentioned, in which, and in order to keep friction as low as possible, the record bearers have lateral protrusions serving to suspend or support the same in a stack holding means.

The record bearers can be imprinted or can further carry a slide capable of projection. It is particularly advantageous if the record bearers have additional information content arranged in scannable magnetic script, or in punched script, so that they can be used in the usual punched card machines.

Yet another object of the invention is to provide apparatus for the automatic selection of record bearers having scannable identification indicia at their edges and including a device to receive the stacked record bearers and a selection mechanism for the identification indicia, as well as including scanning members arranged in two groups cooperable with the record bearers under the control of a control device in a manner such that the record bearers are shifted in opposite directions during one searching operation.

A still further object of the invention is to provide such an apparatus including arresting means cooperable with the record bearers under the control of the control device.

Yet another object of the invention is to provide an apparatus of the type just mentioned and in which, in a first operation, the record bearers of one class are held by arresting means and the record bearers of the other class are moved by a first group of scanning members into a position displaced from their rest position and in which position the desired record bearer of the shifted class is selected by means of a second group of scanning members.

Yet a further object of the invention is to provide an apparatus of the type just mentioned and including means whereby, if required, a second operation may be performed in which the record bearers of the class first shifted are arrested in a rest position and the record bearers of the class first arrested are shifted by the scanning members of the first group from their rest position and, in the shifted position, the desired record bearer of the now shifted class is selected by the second group of scanning members.

In accordance with the invention, another object is to provide such an apparatus in which the scanning members are arranged by groups in a carrier which is reciprocable in a known manner and designed as a sliding carriage.

Yet another object of the invention is to provide an apparatus of the type just mentioned as including a carrier, and in which the scanning members are positioned on opposing sides of the carrier and comprise rails arranged one above the other and extending perpendicular to the sides of the record bearers having the identification indicia.

Alternatively, the scanning members can be endless belts driven through gearing by the carrier and in a direction opposing the direction of movement of the carrier and in such fashion that there is no relative motion between the endless belts scanning members and the record bearers shifted thereby.

The arresting means are preferably U-shaped rails mounted so as to be shiftable vertically and spring biased to their rest position engaging the respective classification indicia of the record bearers. A roller is mounted on the carrier to engage these rails, and either to retain them in position or to release them from the record bearers.

For an understanding of the principles of the invention, reference is made to the following description of typical embodiments thereof as illustrated in the accompanying drawings.

While the method of the invention provides for the selection of record bearers either singly, in pairs, or in groups, the selection of a pair of record bearers will be described in the following solely by way of example, this pair being the pair of record bearers illustrated in FIGS. 1A and 1B. Referring to these figures, the pair of record bearers consists of an "A-card" 10 having substantially the size and configuration of a standard punched card, and a similarly sized and configured "B-card" 11. Adjacent its upper edge, each card 10 or 11 has extensions or protrusions 12, 12a or 13, 13a, respectively, which serve to support the respective card on rails 51 of a selecting device 50 shown in FIG. 2.

Figure 1A:
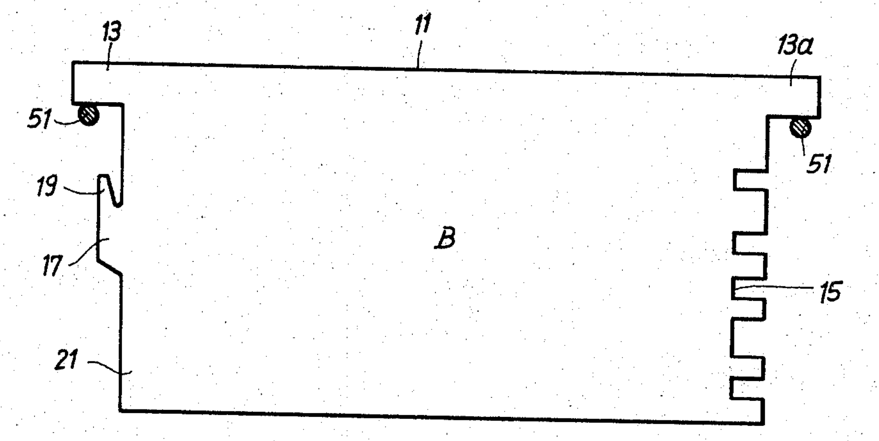
FIG. 1A is an elevation view of a record bearer or card belonging to one class in accordance with the invention.
Figure 1B:
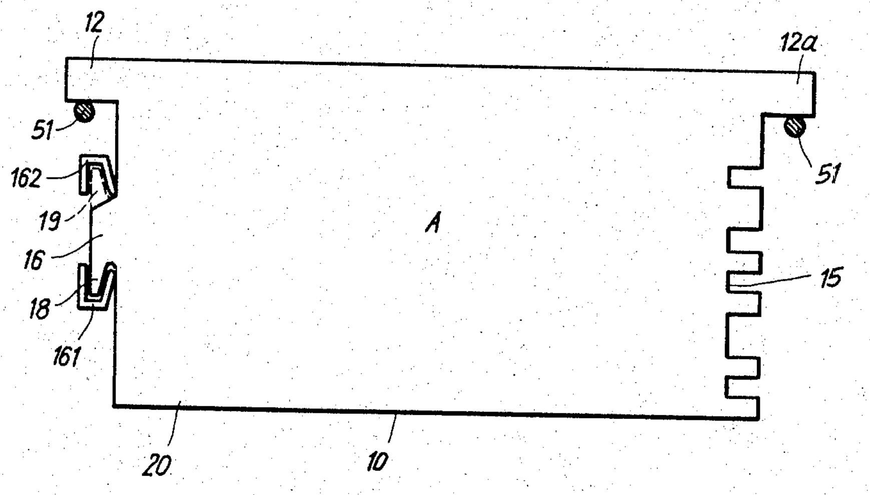
FIG. 1B is an elevation view of a pair of cards, each belonging to a different class, in accordance with the invention, and illustrating their association with respective arresting means.

On the right hand edges, as viewed in FIGS. 1A and 1B, cards 10 and 11 are provided with matching notches 15 comprising so-called "identification indicia" in scannable form and related to the information contained on the two cards. On their left hand edges as viewed in FIGS. 1A and 1B, cards 10 and 11 have protrusions 16 and 17, respectively. Protrusion 16 has a downwardly pointed nose 18, and protrusion 17 has an upwardly pointed nose 19. Noses 18 and 19 constitute classification indicia, one related to the "class A" cards and the other common to the "class B" cards.

The free spaces 20 and 21 of cards 10 and 11, respectively, can bear, in accordance with their intended purposes, information corresponding to the notches 15. This information may be provided in the form of regular printing, a correlated drawing, a slide capable of projection, and/or punch holes or scannable magnetized areas according to any desired key.

Any number of A-cards and B-cards can be combined into one stack of cards 25 (FIGS. 2, 3 and 4) supported by rails 51 of the selecting device. However, the cards are always arranged in pairs, each including an A-card and a B-card and the two cards both having the same identification indicia 15. When the cards are arranged in a stack, the noses 18 of all the A-cards point downwardly, and the noses 19 of all the B-cards point upwardly, as particularly apparent from FIG. 1B.

Figure 2:
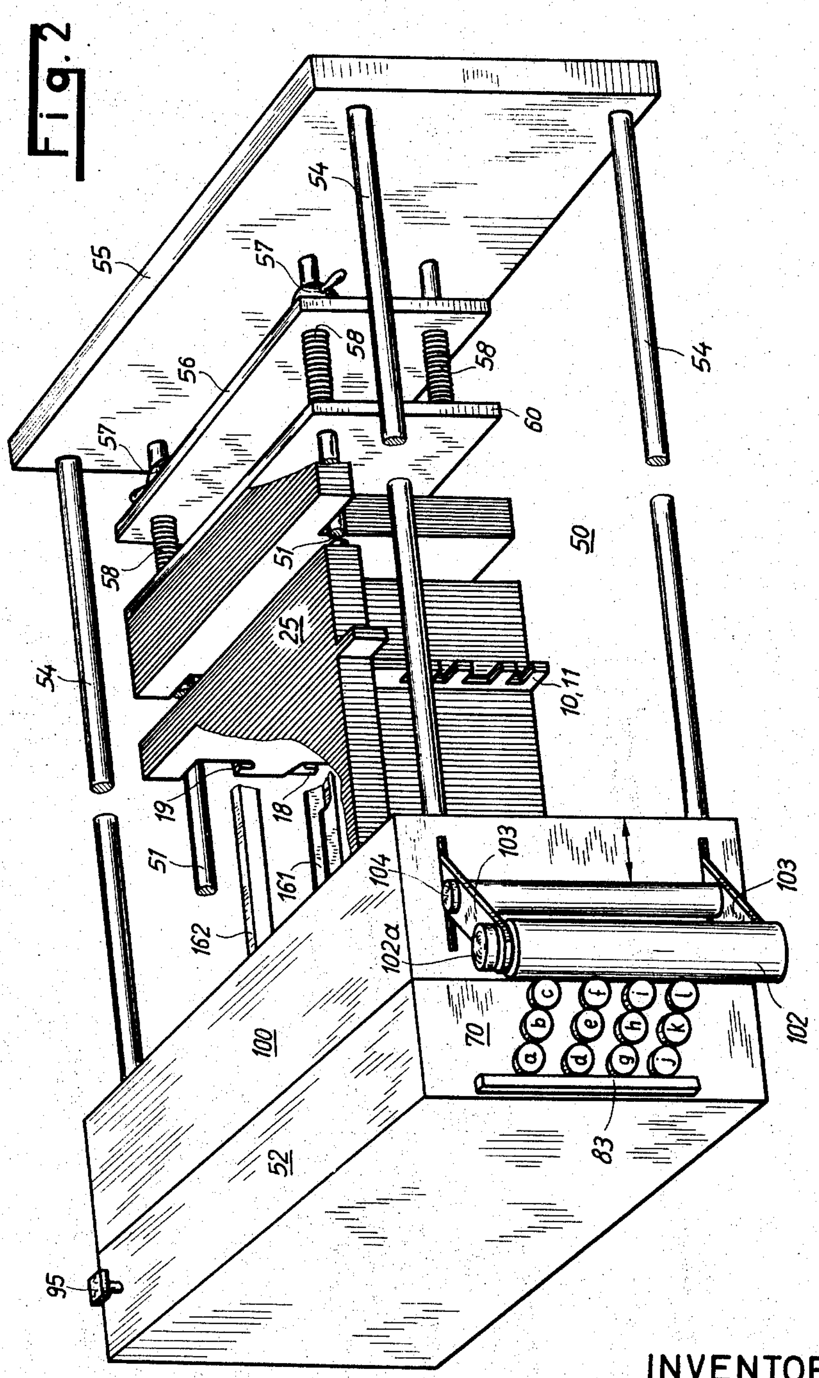
FIG. 2 is an overall perspective view of apparatus embodying the invention and used in performing the method of the invention, and stacked with the record bearers of the invention.
Figure 3:
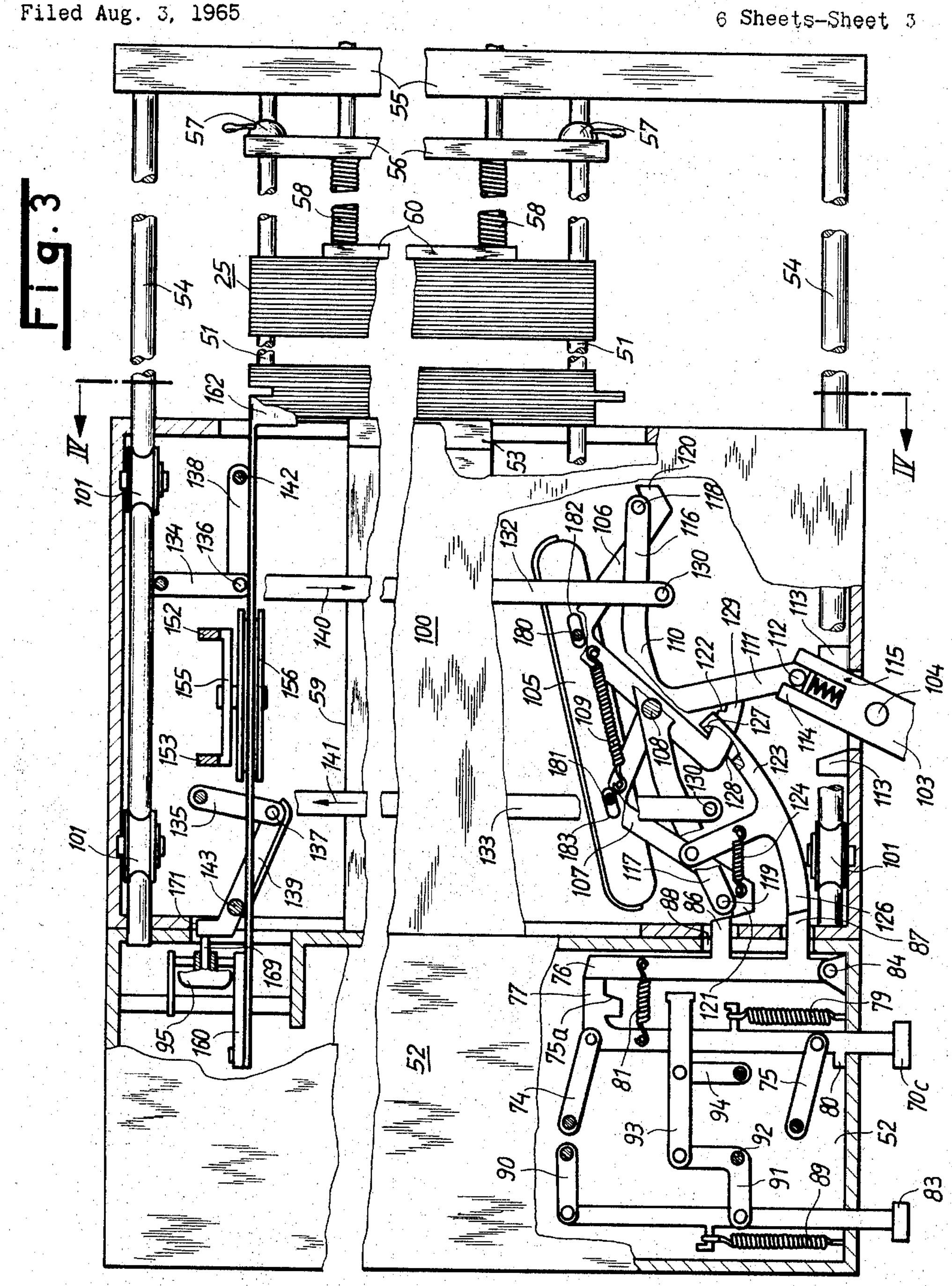
FIG. 3 is a top plan view, partly in section, of the apparatus shown in FIG. 2.

Referring to FIG. 2, the selecting device generally indicated at 50 includes a housing component 52 rigidly connected to an end plate 55 by four circular cross section rods 54. In advance of end plate 55, a plate 56 is so mounted on rails 51 that it can be moved back and forth and can be fixed in adjusted position on rails 51 by means of clamping devices 57. A pressure plate 60 is positioned in advance of plate 56, with the interposition of compression springs 58, and plate 60 bears against the stack of cards 25. A plate 53, as best seen in FIG. 3, is secured to a carrier 59 which is, in turn, secured to housing part 52, and plate 53 serves as a front abutment for the card stack 25. As will be apparent from FIG. 3, plate 53 extends somewhat rearedly, or to the right as viewed in FIG. 3, of a sliding carriage 100 which is illustrated in its rest position, so that stack 25 can be inserted readily between plates 53 and 60 when the selection device is in its rest position illustrated in FIG. 3.

Rails 51 also are secured between housing part 52 and end plate 55.

Sliding carriage 100 has an approximately inverted U-shape or channel shape cross section and carries the scanning members, described hereinafter. This carriage glides along the rods 54 on which it is supported by means of rollers 101. Carriage 100 can be reciprocated, in the direction of the arrow shown in FIG. 2, by means of a handle 102 secured at its ends to levers 103 which are pivotal on a pintle or shaft 104. In order to shift carriage 100, handle 102 must be unlocked by actuating a push button 102a of an unlocking device which has not been illustrated in detail. As best seen in FIG. 3, a pair of steps 113 limit the movement of levers 103 in opposite directions.

Referring again to FIGS. 2 and 3, housing component 52 has a keyboard 70 for the selection of identification indicia. In the particular example selected for illustration, this keyboard comprises 12 selection keys labelled "*a*" through "*l*" and one zero positioning key 83. As more particularly apparent from FIG. 3, the individual keys of keyboard 70, for example, key 70c are articulated to housing component 52 by means of links 74 and 75. Each key 70 has a protrusion 77 engaging a respective lever 76, and a respective spring 79 biases each key to a rest position, illustrated in FIG. 3, in which a stop 80 engages a wall of housing component 52. A tension spring 81 connects the stem of each key to its associated lever 76, tending to pivot the associated lever 76 about the pivot point 84 and counterclockwise as viewed in FIG. 3. However, this counterclockwise movement is inhibited by the protrusion 77 of the respective key in its rest position. Each lever 76 has two protrusions or extensions 86 and 87 which extend into the interior of carriage 100 through openings or breaks 88 in housing component 52.

Zero positioning key 83 is biased by a tension spring 89 to the rest position illustrated in FIG. 3 and is articulated to housing component 52 by a link 90 and bell crank lever 91 which is secured to a shaft 92. When key 83 is operated, bell crank 91, through the medium of a yoke 93 articulated to housing component 52 by means of links 94, can swing levers 76 clockwise. Thus, when a key 70 has been operated, its abutment or protrusion 77 will disengage the free end of the associated lever 76 and the latter will be swung counterclockwise by tension spring 81 to engage against protrusion 75a of the associated key 70c. To "clear" the key board, the key 83 is then operated and, as described, yoke 93 will engage all the levers 76 and move them counter clockwise, stretching springs 81. This releases the operated keys 70 so that they can be moved back to the rest position by springs 79, re-engaging protrusions 77 with the free ends of levers 76.

Figure 5:
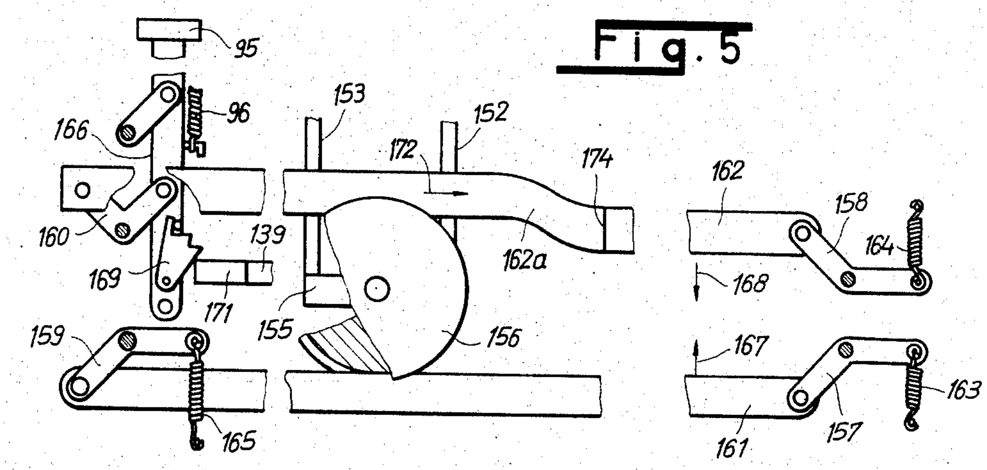
FIG. 5 is an elevation view of the arresting means as viewed looking outwardly from the stack of record bearers.

Key 95 projects upwardly from housing component 52, as best seen in FIG. 2. This key is maintained in its rest position by a spring 96, as best seen in FIG. 5, and is to be actuated prior to introducing a card or a pair of A-cards and B-cards into stack 25.

Switching or selection means required to select a card or a pair of cards from stack 25 are arranged in carriage 100. The switching means includes glide rails 105 serving as scanning members or elements cooperating with the notches 15 of the cards in stack 25. In the present example selected for illustration, a "6 from 12 code" is used, and therefore 12 glide rails 105 are provided. Each glide rail 105 has articulated connections to a pair of angular levers 106 and 107 each having one arm pivotal on a shaft 108 in carriage 100. The angle included between levers 105 and 107, and shaft 108, can be changed to a limited extent. Thus, a pin 180 on a lever 106 engages a slot 182 toward one end of glide rail 105, and a pin 181 on a lever 107 engages an elongated slot toward the opposite end of the associated glide rail 105. A spring 109 is connected between the pivoted arms of levers 106 and 107 and tends to bias the arms in such a direction as to make the angle included, with shaft 108, at a small a value as possible.

For example, spring 109 biases lever 106 counterclockwise, and biases lever 107 clockwise, about shaft 108.

Figure 4:
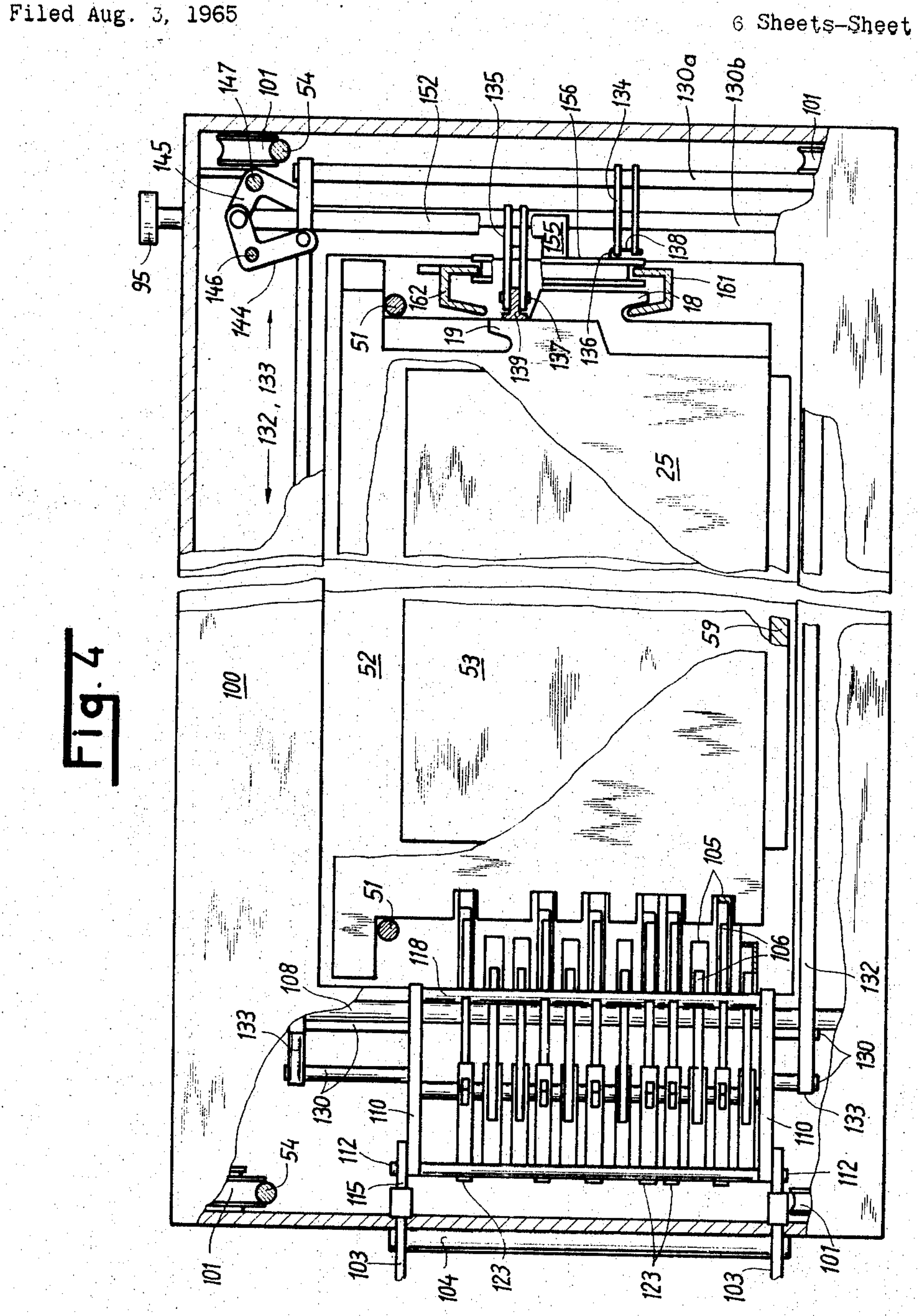
FIG. 4 is a transverse vertical sectional view taken along the line IV—IV of FIG. 3.

Each glide rail 105, with its associated levers 106 and 107 comprises a set, and these sets are "stacked" along shaft 108 as best seen in FIG. 4. A pair of T-shaped levers 110 are also pivotal on shaft 108, one of these levers being arranged above the just mentioned stack of "sets" and the other just below the same. Each lever 110 has a stem 111 carrying a pin 112 which is engaged in a slot 114 in the inner ends of the levers 103 carrying the handle 102. The ends 116 of the two levers 110 are interconnected by a bolt or pin 118, and the ends 117 thereof are interconnected by a bolt or pin 119. Lever 106 has a nose 120 engaging behind bolt 118, and lever 107 has a nose 121 engaging behind bolt 119. In the position of the parts illustrated in FIG. 3, each nose 121 engages the extension 86 of the associated lever 76.

A locking lever 123 is associated with each angular lever 107, being rockably mounted thereon. A tension spring 124 biases each lever 123 clockwise with respect to its associated lever 107, so that the arm 126 of the respective lever 123 engages the extension or protrusion of the associated lever 76. The other end 127 of each lever 123 is formed with an ear or aperture 128 into which there extends a nose 129 of the associated angle lever 106.

As best seen in FIGS. 3 and 4, the opposite ends of the T-shaped levers 110 are connected, by spacer bolts 130, to the ends of a respective pair of rails 132 and 133 which are reciprocable laterally of the carriage. One pair of rails 132 and 133 is arranged adjacent the upper part of the carriage and the other pair adjacent the lower part of the carriage. The opposite ends of the upper and lower rails 132 are interconnected by a spacer bolt or rod **130*a* and this rod has pivotally connected thereto, intermediate its ends, a double lever 134, as illustrated in FIG. 4. Similarly, the opposite ends of the two rails 133 are interconnected by a spacer bolt 130*b* and this spacer bolt has pivotally connected thereto, intermediate its ends, a double lever 135. The free end of lever 134 is connected to one end of a glide rail 138 at a pivot 136, and the free end of lever 135 is connected to one end of a glide rail 139 at a pivot 137. Glide rails 138 and 139 are swingably mounted on shafts 142 and 143, respectively, secured in carirage 100. These glide rails are so mounted that glide rails 138 is positioned approximately opposite noses 18 of cards 10, and similarly glide rail 139 is positioned approximately opposite noses 19 of cards 11**.

A pair of shafts 146 and 147 extend horizontally and longitudinally of carriage 100 adjacent to the upper side thereof. Shaft 146 rockably supports a bell crank 144 having one end secured to an upper rail 132, and shaft 147 rockably supports a bell crank 145 having one end pivotally secured to the upper rail 133. A suspension rod 152 has its upper end pivotally connected to the other end of bell crank 144, and a suspension rod 153 has its upper end pivotally connected to the other end of bell crank 145. As best seen in FIGS. 4 and 5, the lower ends of rods 152 and 153 are interconnected by a cross member or frame 155 which rotatably mounts a roller 156.

Roller 156 is operatively associated with a pair of arresting means in the form of holding rails 161 and 162 which are of U-shape or channel cross section, and which face each other. As best seen in FIG. 5, holding rail 161 is supported by a pair of pivotally mounted bell cranks 157 and 159 so as to be vertically displaceable. Holding rail 162 is supported by a bell crank 158 and a bell crank 160 so as to be vertically displaceable. These holding rails, in the rest position of the selecting device engage noses 18 and 19, respectively, of the "A" and "B" cards of stack 25, as schematically illustrated in FIG. 1B.

Holding rail 162 has an offset **162*a* in that portion near to housing component 52. Bell cranks 157 and 158 are mounted in end plate 55 in a manner not illustrated, and bell cranks 159 and 160 are mounted in housing component 52, also in a manner not specifically illustrated. Rail 161 is biased upwardly in the direction of the arrow 167 by tension springs 163 and 165, and rail 162 is biased downwardly, in the direction of arrow 168, by tension springs 164 and 96. Spring 96 acts through stem 166 of key 95 which is pivotally connected to one end of bell crank 160. The upward and downward displacements of rails 161 and 162 are controlled by means of roller 156** as will be explained more clearly hereinafter.

Figure 8:
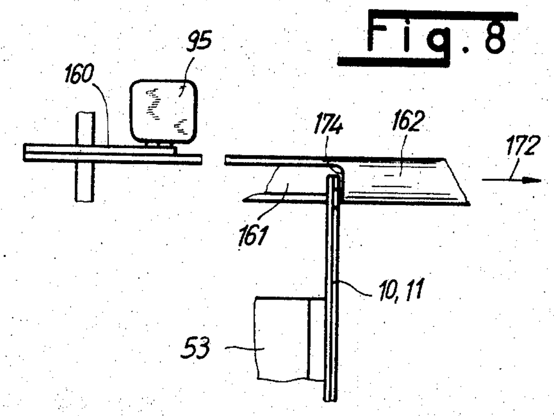
FIG. 8 is a detailed partial top plan view corresponding to FIG. 5.

Through bell crank 160, holding rail 162 can be raised by actuating key 95. When key 95 is depressed, from the position shown in FIG. 5, a spring loaded locking pawl 169 pivoted on stem 166 engages beneath an extension 171 of glide rail 139 so that, in the rest position of carriage 100 as illustrated in FIG. 3, rail 162 is raised and simultaneously shifted in the direction of arrow 172. This moves a recess 174, formed in the upper part of rail 162, into a position in front of seating plate 53 of the selecting device, as best seen in FIG. 8. In this position of rail 162, record bearers removed from stack 25 can be returned to the stack.

Figure 9:
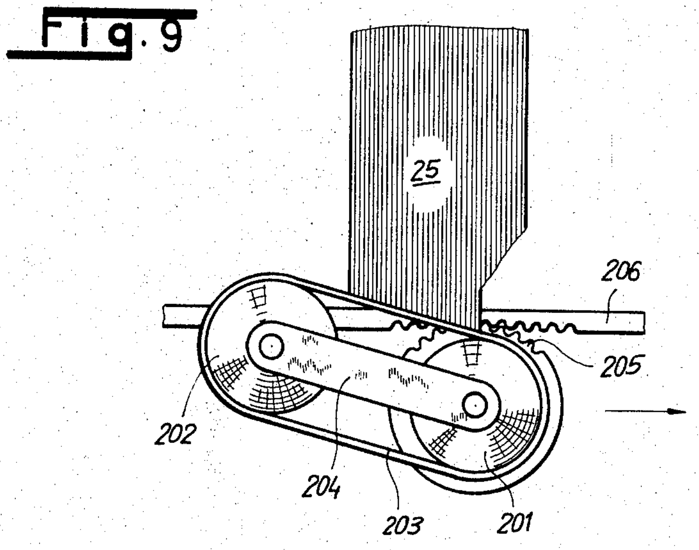
FIG. 9 is a partial plan view illustrating an alternative embodiment of the scanning means.

FIG. 9 illustrates an alternative embodiment of the feeler means cooperable with the identification indicia notches 15 of the cards 10 and 11. In this embodiment, the feeler means comprises endless belts 203 carried by pulleys 201 and 202 and driven by the pulley 201. Each pair of pulleys 201 and 202 is rotatably mounted in a rail or bracket 204 to which the previously mentioned angle levers 106 and 107 are articulated. For the sake of clarity, these angle levers and the associated switching means previously described have been omitted from FIG. 9. Pulley 201 is a driving pulley which is connected to a pinion 205 engaging a rack 206 secured between housing component 52 and end plate 55. Thereby pulley 201 is rotated in opposite directions as carriage 100 is reciprocated back and forth. The dimensions have been so chosen that the belts 203, which act upon the identification indicia of the cards, have no relative motion with respect to the cards during scanning motion of carriage 100 along stack 25.

The operation of the selecting device will be apparent from the following description. After setting plate 56 has been adjusted to the size of the card stack 25 in the selecting device, this card stack, consisting of pairs of record bearers each including one A-card and one B-card, the identification number of the pair of cards to be selected is set by depressing the appropriate keys on key board 70 after actuating zero position key 83. If, for example, the pair of cards illustrated in FIG. 1 is to be selected, keys **74*a***, *d*, *f*, *h*, *i* and *k* are depressed in accordance with the selected "6 from 12" code. When these keys are pressed, the respective levers 76 associated therewith are released by the extensions 77 on the key stems so that the levers 76 are biased counterclockwise, as viewed in FIG. 3, to engage the extension **75*a* of the associated key stems, locking the actuated keys in the operated position. At the same time, the extensions 86 and 87 of each operated lever 76** are retracted from the position shown in FIG. 3.

Handle 102 is now actuated by moving it to the right from the position shown in FIG. 3, after actuating button **102*a*, in order subsequently to move carriage 100 to its right end position as limited by end plate 55. When handle 102 is swung to the right, levers 110 are pivoted into the position illustrated in FIG. 6, or clockwise from the position illustrated in FIG. 3. During this swinging movement of levers 110, the angle levers 106 are swung clockwise by engagement of bolt 118 with noses 120**.

The angular levers 107 associated with the respective operated keys 70 can participate in the pivoting of T-shaped levers 110 because arms 121 of these levers 107 are not restricted by extensions 86 of the associated levers 76. Thus, under the bias of respective springs 109, these levers 107 move to be position shown in FIG. 6. However, the angle levers 107 associated with the non-operated keys 70 are prevented from participating in the motion of the levers 110 because the extensions 86 of the respective levers 76 remain in the positions of FIG. 3. Nevertheless, with the motion of levers 106, arms 129 of the associated levers 106 swing out of the ears 128 of the associated locking levers 123. This moves the associated locking levers 123 counterclockwise until they snap in behind the recesses 122 of arms 129 thus locking the mutual positions of the associated angle levers 106 and 107.

Figures 6, 7:
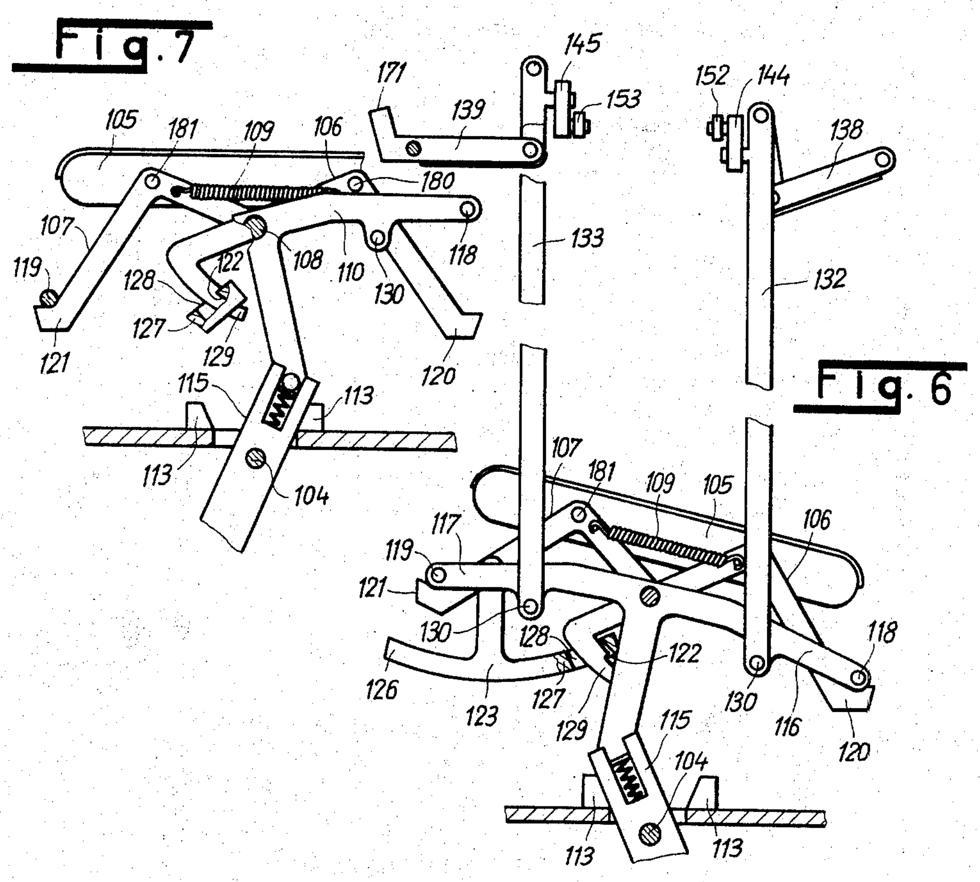
FIG. 6 is a top plan view of the selection means in a working position different from that of FIG. 3.
FIG. 7 is a top plan view of the selection means in their rest position.

As all of the angle levers 106 and 107 associated with operated keys 70 reach the position of FIG. 6, the rails or scanning means 105 respectively associated therewith are brought into their working positions, as shown in FIG. 6. All of the angle levers 107 respectively associated with an unoperated key 70, reach the position as shown in FIG. 7, so that the rails or scanning means 105 respectively associated therewith are brought into their illustrated rest positions.

As levers 110 are rocked counerclockwise by swinging of handles 102, rails 132 and 133 are moved in the direction of the respective arrows 140 and 141. Through the medium of bell cranks 144 and 145 secured to the ends of rails 152 and 153, roller 156 is lowered and moves arresting means 161 downwardly in the direction opposite to the arrow 167 (FIG. 5). This releases all of the A-cards 10 of stack 25. However, holding rail or arresting means 162 remains in its position, as it is not operated by roller 156. Therefore, all B-cards 11 in stack 25 are retained against movement.

Also, movement of rail 132 in the direction of arrow 140 pivots glide rail 138 counter clockwise through link 134, so that glide rail 138 assumes the working position illustrated in FIG. 6. Simultaneously, rail 133, through leg 135, pivots glide rail 139 from its work position illustrated in FIG. 3 to its rest position illustrated in FIG. 6.

From FIG. 6 it will be noted that the inner or operating end of glide rail 138 is in advance, considered with respect to a movement to the right of the carriage 100, of the operating inner end of glide rail 105. Thus, as carriage 100 is moved to the right as viewed in FIG. 3, all A-cards 10 of stack 25 are shifted to the left, as viewed in FIG. 4, by glide rails 138. The card corresponding to the keyed-in identification is selected from the cards shifted to the left by glide rail 105. Such selection is accomplished by the glide rails 105 returning to the right, as viewed in FIG. 4, all A-cards 10 whose notch identification indicia does not coincide with the keyed-in identification.

When carriage 100 arrives at its limiting right hand position, where it engages end plate 55, handle 102 must be swung back in a clockwise direction in respect to FIG. 6, after operating locking button 102*a*. This returns handle 102 to the position illustrated in FIGS. 2 and 3. With the swinging of handle 102, as just described, levers 110 are swung clockwise moving rails 132 and 133 in directions opposite to the respective arrows 140 and 141. This results in the glide rail 138 moving to the rest position illustrated in FIG. 3 and in the glide rail 139 moving into the working position illustrated in FIG. 3. Simultaneously, roller 156 is lifted, releasing rail 161 to move upwardly to engage the nose 18 of the A-cards 10, and rail 162 is lifted upwardly by engagement with roller 156 to release the noses 19 of the B-cards 11.

Those angle levers 106 and 107 associated with the operated keys 70 are pivoted about pivots 108 by bolts 118 and 119 so that the respective glide rails 105 assume the working position illustrated in FIG. 3. The levers 106 associated with the non-operated keys 70 are restrained against movement by the locking levers 123, as shown in FIG. 7. Consequently, the glide rails 105 associated with the non-operated keys retain the rest position illustrated in FIG. 7.

It will be noted, from a consideration of FIG. 3, that the inner end of the glide rail 139 "leads," considered in the direction of movement to the left, the inner ends of the glide rails 105. Thus, as carriage 100 is moved from its right extreme position to the rest position illustrated in FIG. 3, all B-cards 11 of stack 25 are shifted to the left, as viewed in FIG. 4 by means of glide rail 139. All of the thus shifted B-cards 11 whose notch identification indicia 15 does not coincide with the keyed in identification are immediately shifted back to the right, as viewed in FIG. 4, by glide rails 105 associated with the respective operated keys 70.

When carriage 100 assumes its rest position as illustrated in FIG. 3, holding rail 162 can move downwardly again due to its offset portion 162*a*. This holding rail or arresting means 162 can thus again engage noses 19 of the B-cards 11. It will be remembered that holding rail 161 was not influenced by the upward movement of roller 156 so that it remains in engagement with the noses 18 of the A-cards 10. Consequently, all of the cards of stack 25, with the exception of the pair of cards shifted to the left as viewed in FIG. 4, are retained against movement. This condition is illustrated in FIG. 2. Thus the pair of cards 10 and 11 which protrudes from the stack of cards can now be removed from stack 25 manually.

To return a removed pair of cards to stack 25, it is necessary to operate key 95. Referring to FIG. 5, when key 95 is depressed, holding rail or arresting means 162 is raised through L-crank 160 and also shifted to the right in the direction of the arrow 172. The key 95 is retained in its depressed position by the spring loaded locking pawl 169 which engages behind extension 171 of glide rail 139. Referring to FIG. 8, the pair of cards can now be inserted into stack 25 immediately adjacent plate 53 by virtue of the recess 174 in holding rail 162. The detention of key 95 is released when handle 102 is moved counterclockwise as viewed in FIG. 3. When this occurs, glide rail 139 is so shifted as to disengage its end 171 from locking pawl 169. Key 95 is moved upwardly by tension spring 96 and rail 162, being released, is moved downwardly, both by the upward movement of key 95 and by the bias of spring 164 acting on bell crank 158.

Before operating the key board to set a new identification, the positioning key 83 must be operated. This swings bell crank 91 clockwise, moving yoke 93 to the right as viewed in FIG. 3. Those levers 76 which had snapped against the protrusion 75*a* of the operated keys 70 are thus returned to the position shown in FIG. 3 by engagement with yoke 93. Simultaneously, springs 79 retract the operated keys to their starting position.

When levers 76 swing back to the position shown in FIG. 3, T-shaped levers 123 are moved counterclockwise thus releasing the detention effected by ears 128 and recesses 122. Under the influence of springs 109, angle levers 106, and thus glide rails 105, assume their starting position illustrated in FIG. 3.

The preceding description relates to an example of the selecting device in which the selected pair of cards are removed from stack 25 manually and manually returned to the stack. However, it should be understood that the particular described example can be supplemented by electro-mechanical switching means for effecting such removal and return and without departing from the fundamentals of the invention. It is furthermore possible, within the skill of the art, to eject the selected pair of cards from stack 25 by means of an automatically functioning ejection device, and to return the selected pair of cards to stack 25 by means of rollers or similar instrumentalities.

While specific embodiments of the invention have been shown and described in detail to illustrate the application of the principles of the invention, it will be understood that the invention may be embodied otherwise without departing from such principles.

What is claimed is:

1. Apparatus for automatically selecting record bearers from a stack of record bearers of the type having scannable identification indicia at their edges cooperable with scanners of a searching device, said apparatus comprising, in combination, means supporting a stack of such record bearers divided into two classes having different respective classification indicia in addition to the identification indicia; first and second scanning means movable along such stack; first and second arresting means each selectively operable to arrest the record bearers of a respective class in a rest position; setting means operable to set said second scanning means in accordance with the identification indicia of at least one record bearer in the stack; and control means connected to said scanning means and to said arresting means and operable to traverse said scanning means along the stack of record bearers; said control means, when actuated, operating said arresting means to release the record bearers of one class while maintaining the record bearers in the other class in the rest position and positioning said first scanning means to engage and shift the record bearers in one class during traversal along the stack; said second scanning means, during traversal along the stack, shifting back to the rest position all the record bearers of said one class except those having identification indicia corresponding to the setting of said second scanning means.

2. Apparatus for automatically selecting record bearers from a stack of record bearers of the type having scannable identification indicia at their edges cooperable with scanners of a searching device, said apparatus comprising, in combination, means supporting a stack of such record bearers divided into two classes having different respective classification indicia in addition to the identification indicia; first and second scanning means movable along such stack; first and second arresting means each selectively operable to arrest the record bearers of a respective class in a rest position; setting means operable to set said second scanning means in accordance with the identification indicia of at least one record bearer in the stack; and control means connected to said scanning means and to said arresting means and operable to traverse said scanning means along the stack of record bearers; said control means, when actuated, operating said arresting means to release the record bearers of one class while maintaining the record bearers in the other class in the rest position and positioning said first scanning means to engage and shift the record bearers in one class during traversal along the stack; said second scanning means, during traversal along the stack, shifting back to the rest position all the record bearers of said one class except those having identification indicia corresponding to the setting of said second scanning means; said control means, when actuated to move in the opposite direction along the stack, operating the other arresting means to release the record bearers of the other class while maintaining the record bearers of such one class in the rest position and positioning said first scanning means to engage and shift the record bearers of said other class during traversal along the stack in such opposite direction; said second scanning means, during traversal along the stack in such opposite direction, shifting back to the rest position all the record bearers of said other class except those having identification indicia corresponding to the setting of said second scanning means.

3. Apparatus for automatically selecting record bearers from a stack of record bearers of the type having scannable identification indicia at their edges cooperable with scanners of a searching device, said apparatus comprising, in combination, means supporting a stack of such record bearers divided into two classes having different respective classification indicia in addition to the identification indicia; first and second scanning means movable along such stack; first and second arresting means each selectively operable to arrest the record bearers of a respective class in a rest position; setting means operable to set said second scanning means in accordance with the identification indicia of at least one record bearer in the stack; control means connected to said scanning means and to said arresting means and operable to traverse said scanning means along the stack of record bearers; said control means, when actuated, operating said arresting means to release the record bearers of one class while maintaining the record bearers in the other class in the rest position and positioning said first scanning means to engage and shift the record bearers in one class during traversal along the stack; said second scanning means, during traversal along the stack, shifting back to the rest position all the record bearers of said one class except those having identification indicia corresponding to the setting of said second scanning means; and a carrier mounted for reciprocation along said stack between first and second limiting positions, said carrier mounting said scanning means.

4. Apparatus for automatically selecting record bearers from a stack of record bearers of the type having scannable identification indicia at their edges cooperable with scanners of a searching device, said apparatus comprising, in combination, means supporting a stack of such record bearers divided into two classes having different respective classification indicia in addition to the identification indicia; first and second scanning means movable along such stack; first and second arresting means each selectively operable to arrest the record bearers of a respective class in a rest position; setting means operable to set said second scanning means in accordance with the identification indicia of at least one record bearer in the stack; control means connected to said scanning means and to said arresting means and operable to traverse said scanning means along the stack of record bearers; said control means, when actuated, operating said arresting means to release the record bearers of one class while maintaining the record bearers in the other class in the rest position and positioning said first scanning means to engage and shift the record bearers in one class during traversal along the stack; said second scanning means, during traversal along the stack, shifting back to the rest position all the record bearers of said one class except those having identification indicia corresponding to the setting of said second scanning means; a relatively elongated housing including first and second longitudinally spaced housing end components; said stack being supported between said components; and a carrier reciprocable longitudinally of said housing between said components and along such stack, said carrier supporting said scanning means.

5. Apparatus for automatically selecting record bearers from a stack of record bearers of the type having scannable identification indicia at their edges cooperable with scanners of a searching device, said apparatus comprising, in combination, means supporting a stack of such record bearers divided into two classes having different respective classification indicia in addition to the identification indicia; first and second scanning means movable along such stack; first and second arresting means each selectively operable to arrest the record bearers of a respective class in a rest position; setting means operable to set said second scanning means in accordance with the identification indicia of at least one record bearer in the stack; control means connected to said scanning means and to said arresting means and operable to traverse said scanning means along the stack of record bearers; said control means, when actuated, operating said arresting means to release the record bearers of one class while maintaining the record bearers in the other class in the rest position and positioning said first scanning means to engage and shift the record bearers in one class during traversal along the stack; and second scanning means, during traversal along the stack, shifting back to the rest position all the record bearers of said one class except those having identification indicia corresponding to the setting of said second scanning means; a relatively elongated housing including first and second longitudinally spaced housing end components; said stack being supported between said components; and a carrier reciprocable longitudinally of said housing between said components and along such stack, said carrier supporting said scanning means; said carrier being guided by support rails extending longitudinally of said housing between said first and second housing end components.

6. Apparatus for automatically selecting record bearers from a stack of record bearers of the type having scannable identification indicia at their edges cooperable with scanners of a searching device, said apparatus comprising, in combination, means supporting a stack of such record bearers divided into two classes having different respective classification indicia in addition to the identification indicia; first and second scanning means movable along such stack; first and second arresting means each selectively operable to arrest the record bearers of a respective class in a rest position; setting means operable to set said second scanning means in accordance with the identification indicia of at least one record bearer in the stack; control means connected to said scanning means and to said arresting means and operable to traverse said scanning means along the stack of record bearers; said control means, when actuated, operating said arresting means to release the record bearers of one class while maintaining the record bearers in the other class in the rest position and positioning said first scanning means to engage and shift the record bearers in one class during traversal along the stack; said second scanning means, during traversal along the stack, shifting back to the rest position all the record bearers of said one class except those having identification indicia corresponding to the setting of said second scanning means; a relatively elongated housing including first and second end housing components at opposite ends; said stack being supported between said first and second housing components; said record bearers having said identification indicia on one lateral edge thereof and said classification indicia on the other lateral edge thereof; a carrier mounted on said housing for reciprocation longitudinally thereof between said end components and along said stack, said carrier extending in embracing relation to the top and both lateral sides of the stack; said first scanning means being mounted on a side of said carrier adjacent the lateral edges of said record bearers carrying said classification indicia; said second scanning means being mounted on the side of said carrier adjacent the lateral edges of the record bearers carrying said identification indicia.

7. Apparatus for automatically selecting record bearers from a stack of record bearers of the type having scannable identification indicia at their edges cooperable with scanners of a searching device, said apparatus comprising, in combination, means supporting a stack of such record bearers divided into two classes having different respective classification indicia in addition to the identification indicia; first and second scanning means movable along such stack; first and second arresting means each selectively operable to arrest the record bearers of a respective class in a rest position; setting means operable to set said second scanning means in accordance with the identification indicia of at least one record bearer in the stack; control means connected to said scanning means and to said arresting means and operable to traverse said scanning means along the stack of record bearers; said control means, when actuated, operating said arresting means to release the record bearers of one class while maintaining the record bearers in the other class in the rest position and positioning said first scanning means to engage and shift the record bearers in one class during traversal along the stack; said second scanning means, during traversal along the stack, shifting back to the rest position all the record bearers of said one class except those having identification indicia corresponding to the setting of said second scanning means; a relatively elongated housing including first and second end housing components at opposite ends; said stack being supported between said first and second housing components; said record bearers having said identification indicia on one lateral edge thereof and said classification indicia on the other lateral edge thereof; a carrier mounted on said housing for reciprocation longitudinally thereof between said end components and along said stack, said carrier extending in embracing relation to the top and both lateral sides of the stack; said first scanning means being mounted on a side of said carrier adjacent the lateral edges of said record bearers carrying said classification indicia; said second scanning means being mounted on the side of said carrier adjacent the lateral edges of the record bearers carrying said identification indicia; each of said first and second scanning means comprising plural rails extending parallel to the direction of reciprocation of said carrier and mounted for movement toward and away from the lateral edges of the cards in the stack; said first scanning means including two longitudinally spaced rails at different elevations; said second scanning means comprising a plurality of rails in vertically aligned superposed relation.

8. Apparatus for automatically selecting record bearers from a stack of record bearers of the type having scannable identification indicia at their edges cooperable with scanners of a searching device, said apparatus comprising, in combination, means supporting a stack of such record bearers divided into two classes having different respective classification indicia in addition to the identification indicia; first and second scanning means movable along such stack; first and second arresting means each selectively operable to arrest the record bearers of a respective class in a rest position; setting means operable to set said second scanning means in accordance with the identification indicia of at least one record bearer in the stack; control means connected to said scanning means and to said arresting means and operable to traverse said scanning means along the stack of record bearers; said control means, when actuated, operating said arresting means to release the record bearers of one class while maintaining the record bearers in the other class in the rest position and positioning said first scanning means to engage and shift the record bearers in one class during traversal along the stack; said second scanning means, during traversal along the stack, shifting back to the rest position all the record bearers of said one class except those having identification indicia corresponding to the setting of said second scanning means; a relatively elongated housing including first and second end housing components at opposite ends; said stack being supported between said first and second housing components; said record bearers having said identification indicia on one lateral edge thereof and said classification indicia on the other lateral edge thereof; a carrier mounted on said housing for reciprocation longitudinally thereof between said end components and along said stack, said carrier extending in embracing relation to the top and both lateral sides of the stack; said first scanning means being mounted on a side of said carrier adjacent the lateral edges of said record bearers carrying said classification indicia; said second scanning means being mounted on the side of said carrier adjacent the lateral edges of the record bearers carrying said identification indicia; each of said scanning means including plural scanners; each scanner comprising a relatively elongated bracket rotatably supporting a pair of pulleys and an endless belt trained over said pulleys; and driving means operable by said carrier to rotate said pulleys at a peripheral speed corresponding to the speed of movement of said carrier and to move that run of the belt facing nearest the stack in a direction opposite to the direction of movement of the carriage; whereby there is no relative motion between said belts and record bearers engaged by said belts.

9. Apparatus for automatically selecting record bearers from a stack of record bearers of the type having scannable identification indicia at their edges cooperable with scanners of a searching device, said apparatus comprising, in combination, means supporting a stack of such record bearers divided into two classes having different respective classification indicia in addition to the identification indicia; first and second scanning means movable along such stack; first and second arresting means each selectively operable to arrest the record bearers of a respective class in a rest position; setting means operable to set said second scanning means in accordance with the identification indicia of at least one record bearer in the stack; control means connected to said scanning means and to said arresting means and operable to traverse said scanning means along the stack of record bearers; said control means, when actuated, operating said arresting means to release the record bearers of one class while maintaining the record bearers in the other class in the rest position and positioning said first scanning means to engage and shift the record bearers in one class during traversal along the stack; said second scanning means, during traversal along the stack, shifting back to the rest position all the record bearers of said one class except those having identification indicia corresponding to the setting of said second scanning means; said arresting means comprising U-cross section rails extending longitudinally of the stack in vertically aligned relation; means mounting said rails for vertical displacements; said classification indicia including protruding noses on a lateral edge of said cards, said noses being engageable by the respective U-cross section rail; means biasing both of said rails into engagement with the respective noses associated therewith; and means operable by said control means, when actuated, to disengage a selected arresting rail from the noses of the cards of the class associated therewith.

10. Apparatus for automatically selecting record bearers from a stack of record bearers of the type having scannable identification indicia at their edges cooperable with scanners of a searching device, said apparatus comprising, in combination, means supporting a stack of such record bearers divided into two classes having different respective classification indicia in addition to the identification indicia; first and second scanning means movable along such stack; first and second arresting means each selectively operable to arrest the record bearers of a respective class in a rest position; setting means operable to set said second scanning means in accordance with the identification indicia of at least one record bearer in the stack; control means connected to said scanning means and to said arresting means and operable to traverse said scanning means along the stack of record bearers; said control means, when actuated, operating said arresting means to release the record bearers of one class while maintaining the record bearers in othe other class in the rest position and positioning said first scanning means to engage and shift the record bearers in one class during traversal along the stack; said second scanning means, during traversal along the stack, shifting back to the rest position all the record bearers of said one class except those having identification indicia corresponding to the setting of said second scanning means; said first and second arresting means comprising, respectively, first and second relatively elongated U-cross section rails extending longitudinally of the stack in vertically aligned relation, said arresting rails facing each other; said classification indicia comprising protruding noses on the lateral edges of said record bearers, the noses of the record bearers of one class extending in a direction to engage within said first arresting rail and noses of the record bearers of the other class extending in a direction to engage in said second arresting rail; means mounting said rails for relative vertical displacement; means biasing said rails to engage the noses of the respective cards associated therewith; and means operable by said control means, when actuated, to selectively displace one of said rails vertically to release the cards associated therewith.

11. Apparatus for automatically selecting record bearers from a stock of record bearers of the type having scannable identification indicia at their edges cooperable with scanners of a searching device, said apparatus comprising, in combination, means supporting a stack of such record bearers divided into two classes having different respective classification indicia, in the form of oppositely directed noses, in addition to the identification indicia; first and second scanning means movable along such stack; vertically displaceable upper and lower arresting rails each selectively operable to engage the noses of the record bearers of a respective class to arrest the latter in a rest position, said rails having U-cross sections and facing each other; setting means operable to set said second scanning means in accordance with the identification indicia of at least one record bearer in the stack; control means connected to said scanning means and to said arresting means and operable to traverse said scanning means along the stack of record bearers; said control means, when actuated, operating said arresting rails to release the record bearers of one class while maintaining the record bearers in the other class in the rest position and positioning said first scanning means to engage and shift the record bearers in one class during traversal along the stack; said second scanning means, during traversal along the stack, shifting back to the rest position all the record bearers of said one class except those having identification indicia corresponding to the setting of said second scanning means; a relatively elongated housing including first and second end housing components at opposite ends; said stack being supported between said first and second housing components; said record bearers having said identification indicia on one lateral edge thereof and said classification indicia on the other lateral edge thereof; a carrier mounted on said housing for reciprocation longitudinally thereof between said end components and along said stack, said carrier extending in embracing relation to the top and both lateral sides of the stack; said first scanning means being mounted on a side of said carrier adjacent the lateral edges of said record bearers carrying said classification indicia; said second scanning means being mounted on the side of said carrier adjacent the lateral edges of the record bearers carrying said identification indicia; each of said first and second scanning means comprising plural rails extending parallel to the direction of reciprocation of said carrier and mounted for movement toward and away from the lateral edges of the cards in the stack; said first scanning means including two longitudinally spaced rails at different elevations; said second scanning means comprising a plurality of rails in vertically aligned superposed relation; the uppermost one of said arresting rails being formed with a cut out; and a positioning key connected to said uppermost one of said setting rails and operable to shift the same to a position whereby a removed record bearer may be readily reinserted into the stack at said cut out.

References Cited

UNITED STATES PATENTS

| | | | |
|---|---|---|---|
| 1,317,684 | 10/1919 | Brown et al. | 129—16.1 |
| 1,450,390 | 4/1923 | Robinson | 129—16.1 |
| 1,744,373 | 1/1930 | Erich | 129—16.1 |
| 3,266,497 | 8/1966 | Bleiman | 129—16.1 |
| 3,273,565 | 9/1966 | Townsley | 129—16.1 |
| 3,273,567 | 9/1966 | Smitzer | 129—16.1 |

FOREIGN PATENTS

| | | |
|---|---|---|
| 478,053 | 2/1953 | Italy. |

JEROME SCHNALL, *Primary Examiner.*